United States Patent
Amalfitano et al.

(10) Patent No.: US 7,236,793 B2
(45) Date of Patent: Jun. 26, 2007

(54) QUEUING FAR/FAR SERVICE REQUESTS IN WIRELESS NETWORK

(75) Inventors: Carlo Amalfitano, Melbourne Beach, FL (US); Kevin L. Farley, Palm Bay, FL (US)

(73) Assignee: IPR Licensing, Inc., Wilmington, DE (US)

( * ) Notice: Subject to any disclaimer, the term of this patent is extended or adjusted under 35 U.S.C. 154(b) by 1173 days.

(21) Appl. No.: 09/773,255

(22) Filed: Jan. 31, 2001

(65) Prior Publication Data

US 2002/0102985 A1    Aug. 1, 2002

(51) Int. Cl.
H04Q 7/20    (2006.01)

(52) U.S. Cl. .................. 455/453; 455/63.1; 455/452.2; 455/522; 455/432.1; 455/450; 455/67.13; 455/509

(58) Field of Classification Search ................ 455/446, 455/452.1, 453, 63.1, 63.2, 63, 522, 67.1; 370/347

See application file for complete search history.

(56) References Cited

U.S. PATENT DOCUMENTS

| | | | | |
|---|---|---|---|---|
| 5,758,090 A | | 5/1998 | Doner | 395/200.66 |
| 5,894,473 A | * | 4/1999 | Dent | 370/342 |
| 6,023,622 A | * | 2/2000 | Plaschke et al. | 455/452.2 |
| 6,128,498 A | * | 10/2000 | Benveniste | 455/450 |

* cited by examiner

*Primary Examiner*—Charles Appiah
*Assistant Examiner*—Willie J. Daniel, Jr.
(74) *Attorney, Agent, or Firm*—Volpe & Koenig, P.C.

(57) ABSTRACT

A technique for coordinating the operation of subscriber units such as in a wireless communications system so that high-probability-of-interference communications do not take place at the same time in adjacent cell sites. A base station becomes aware of expected periods or time slots of high relatively expected interference from remote units operating in a neighboring cell site, and then schedules only low interference level transmissions for its own remote units during such periods. Expected interference information can be exchanged by base stations directly, through a centralized base station controller-initiated schedule, or by relaying resource load status messages via remote units located near all boundaries.

12 Claims, 7 Drawing Sheets

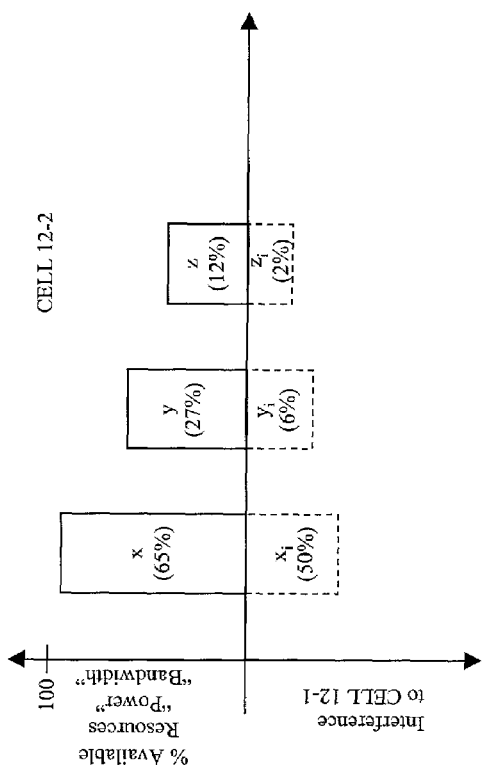
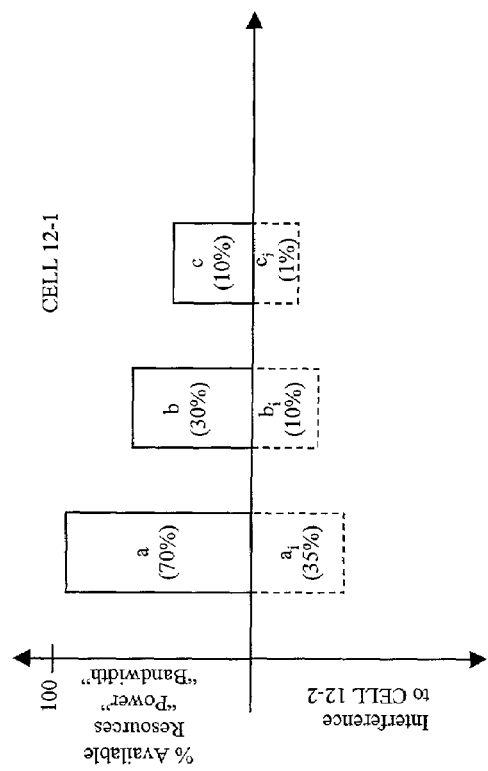
FIG. 3A
FIG. 3B

QUEUING FAR/FAR SERVICE REQUESTS IN WIRELESS NETWORK

BACKGROUND OF THE INVENTION

The so-called near-far problem is well documented in certain wireless communications systems, such as cellular telephone systems. This problem is an artifact of a point-to-multipoint architecture wherein base stations are located in cells. In this architecture, each base station services a number of subscriber units, such as portable handsets, located throughout a cell. The remote subscriber units may be located at various distances from the base station within the cell, and may even be mobile within a cell or between cells.

It becomes desirable in such systems, and in particular, those making use of Code Division Multiple Access (CDMA) type modulation, for precise control over the power levels of the transmitted signals. This is in particular important for reverse link signals, that is, the signals traveling from the subscriber units towards the base station. It is desirable for these signals to all arrive at the base station with approximately the same power level, although they may have to travel over various distances. This is advisable in general for a point-to-multipoint system, but particularly important where CDMA codes are used, because the mathematical premise behind the correct functionality of CDMA coded signals assumes that all transmitters are operating at the same power level. The most widely used approach to solving this problem is for the base station to precisely control the transmit power level at each originating subscriber unit. However, even with precise power level control, subscriber units located in outlying areas of the cell must transmit at higher power levels than do the units located closer in to the base station. The so-called near-far problem thus originates from the fact that the high power transmissions from units located at the outlying areas of the edges of the cell may interfere with the operation of the lower power units closer into the base station.

Of course in a cellular system there are typically many cells each of which are adjacent to other cells and which may have overlapping areas of coverage of other cells. In such a system, mobile units located at the far edges of the cell operating at high power may not only interfere with units located in their own cell, but also with other mobile units located in the adjacent cell. Thus an uncoordinated transmission originating from such a mobile unit operating at high power on the edge of the cell may not only degrade the performance of other units within its own cell, but also affect the performance of other mobile units located in adjacent cells as well.

While this can be tolerated to some extent in analog systems, for CDMA systems, this not only results in interfering with individual communications between individual mobile units and the base station but may also affect the available capacity of the entire adjacent cell. In other words, in CDMA systems, interference between the operation of different mobile units causes degradation in the performance of other units to the extent that the available data rates are reduced. That is, the codes used in a code division multiple access system are based upon a mathematical premise that the individual signals arrive at the receiver with approximately the same power levels. If the signals do not arrive with equal power, errors will occur in the decoding process.

SUMMARY OF THE INVENTION

The present invention coordinates the servicing of high power units located near a cell boundary that are likely to cause interference with units operating in an adjacent cell. In its simplest form, this coordination may take place by recognizing a situation where two subscriber units are each located at the edge of their respective adjacent cells, operating at high power levels. The base stations servicing the two cells then cooperate to permit only one unit or the other unit to be active at any given instant in time. This does not pose a problem for data transmission since the transmission of data can typically be delayed and/or time slotted without a perceived degradation in performance.

In other implementations, the invention provides graded levels of service based upon measured power levels. This has the effect of coordinating the transmission of an aggregate expected high interference time slot in one cell with the transmission of an aggregate expected lower interference transmission time slot in an adjacent cell.

Coordinating the time slots for high interference transmissions in adjacent cells may occur in several ways. In a first embodiment, adjacent base stations may themselves be connected through a wireline communication link, and exchange data concerning the present operating power levels of units operating in their respective cells. The base stations then coordinate a schedule for when the high interference time slots will be allocated among themselves.

In a related scheme, a number of base stations report a list of active remote units and power levels to a central processor, such as a Base Station Controller (BSC). In this case, the BSC acts as a central authority in setting a schedule of high interference time slots to be shared among a group of adjacent base stations.

In yet another embodiment, each base station may periodically broadcast a service status message containing information about its service load level. Such information includes an estimate of the percent of available resources that the base station presently has committed to servicing units located within its own cell. The load estimate is an approximation to the amount of interference being generated by the cell. The service status message may be broadcast on a forward link paging channel or other control channel.

When a service status message is received at a remote unit, it is rebroadcast on a reverse link channel, such as an access or control channel.

If the rebroadcast service status message is detected by the same base station that originated it, nothing further happens in that base station.

However, a rebroadcast service status message may also be detected by a base station that did not originate it. Such a base station may be one which is servicing a cell adjacent to the cell servicing the specific remote unit which rebroadcast the message. The adjacent base station considers receipt of a rebroadcast service status message as a indication that the specific remote unit may interfere with operation of other remote units in its own cell service area. If the adjacent base station's own resource utilization is lower than the resource utilization advertised in the service status message, it will wait before scheduling a high power transmission to a remote unit in its own cell.

This latter embodiment has the advantage of being self-organizing and adaptive to signal transmission environments and cell geography, since only adjacent base stations that are potentially interfered with will hear the rebroadcast service status message.

BRIEF DESCRIPTION OF THE DRAWINGS

FIGS. 3A and 3B illustrate resources allocated and expected interference levels in adjacent cell sites.

Figure 1:
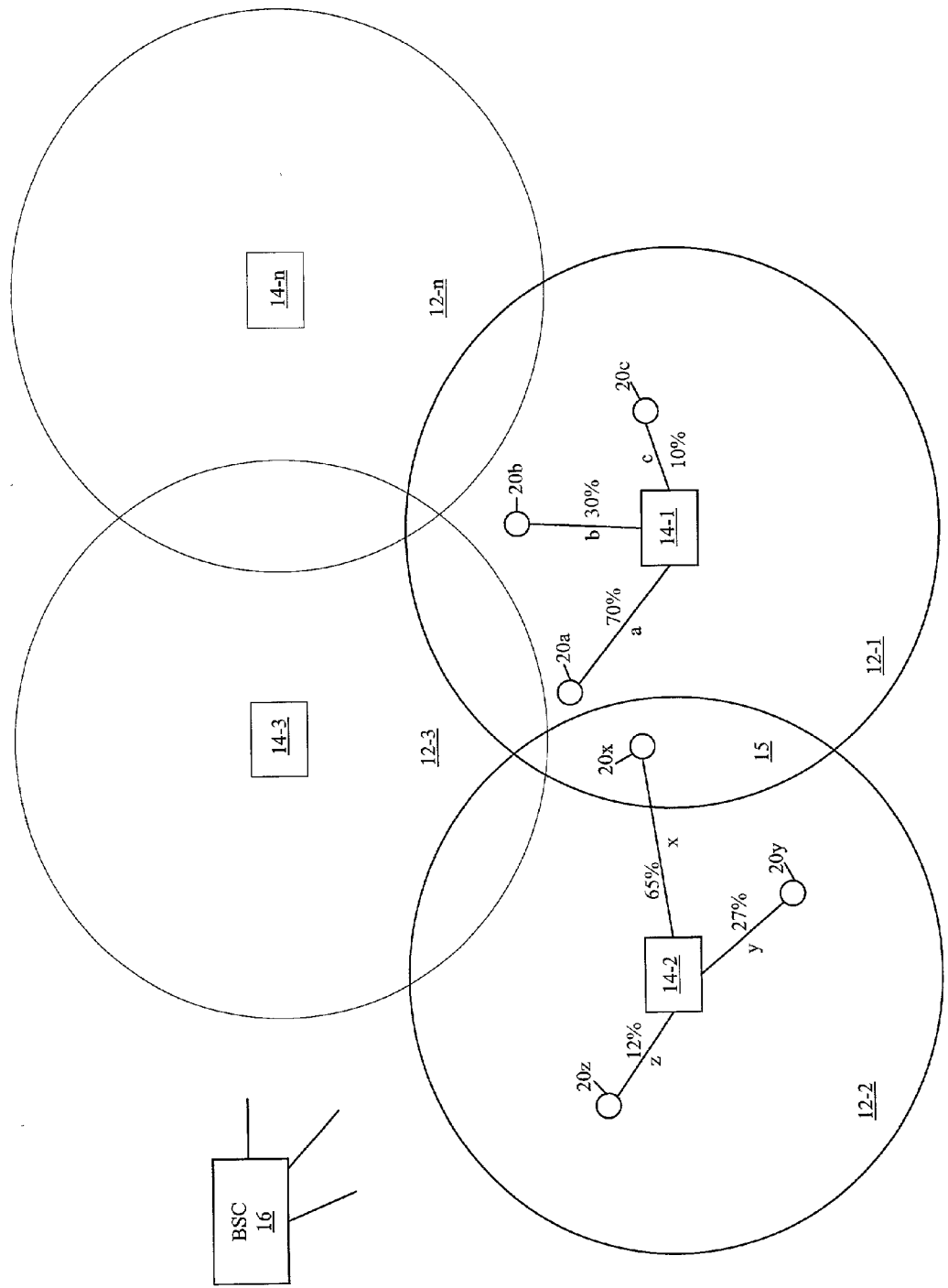
FIG. 1 is a diagram of an area serviced by multiple cells and base stations, illustrating the far-far interference scenario.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

FIG. 1 is a diagram of a typical wireless communication environment 10 in which the invention may be employed. The environment consists of a geographic area that has been divided into a number of cells, 12-1, 12-2, 12-3, . . . , 12-n. The cells have associated with them a base station 14-1, 14-2, 14-3, . . . , 14-n. Operation of the base stations 14 may be coordinated by a Base Station Controller (BSC) 16 which communicates over a desired interface with each base station 14. Although the coverage area of each base station 14 is indicated generally with a circle in FIG. 1, it should be understood that the coverage range of any given base station 14 in a real world scenario is never perfectly circular. Rather, the shape of the area covered by any particular base station 14 depends upon the terrain surrounding the base station 14 and objects such as buildings, trees, mountains, and other natural and manmade features of the landscape.

At least two of the cells 12-1 and 12-2 lie adjacent one another such that there is a region 15 in which they overlap in and/or at least have regions which are adjacent or near to one another. It is the control of the operation of mobile units such as mobile unit 20x operating in or near this adjacent region 15 that is the subject of the present invention. Before proceeding with the discussion of how resources such as radio frequency channels and/or bandwidth capacity are allocated to mobile unit 20x, other features of the system 10 should first be described.

Note in particular there are a number of mobile units 20 including mobile units 20x, 20y, and 20z that are presently within the range of base station 14-2. Likewise, mobile units 20a, 20b, and 20c are within the range of base station 14-1. Note too that the diagram indicates the amount of channel resources that each of the respective mobile units 20 is requesting in order to communicate with the base station 14. Specifically, the mobile units 20 may be subscriber access units (SAU) that provide wireless data connectivity such as to provide connections from a laptop computer to associated with each mobile unit 20 and a data network such as an Internet access that may be reachable through network connections made at the base stations 14.

The nature of the system 10 and the control of access to the radio resources in each cell site 12 is such that channel capacity may be allocated in precise increments to specific subscriber units 20. The channels may, for example, be divided based upon available bandwidth, coding rates, symbol encoding type, error correction schemes employed, and the like. As illustrated in connection with cell 12-1, a first mobile unit 20a in the cell is using 70% of the available channel resources in order to obtain the desired data rate that it requires at the present time. Likewise, mobile units 20b and 20c in cell 12-1 are requesting use of respectively, 30% and 10% of the available resources. The situation is somewhat difficult, of course, since the overall aggregate requests for resources is greater than 100% of the available resources. Therefore, a scheme must be devised for allocating the available resources at any given instant among the units 20a, 20b, and 20c requesting access to them.

A similar situation exists in cell 12-2 whereby a mobile unit 20x is requesting 65% of the available resources, unit 20y is requesting 27% of the resources, and unit 20z is requesting 12% of the resources. It should also be noted that at this point that the relative distances between the various mobile units 20 and their respective servicing base stations 14 will enter into the picture when describing the invention below. In particular, mobile unit 20x is within the region of overlap 15 whereby it is relatively far away from the base station 14-2 serving it. In contrast to this, the mobile unit 20z is much closer in location to its serving base station 14-2. A similar situation exists in cell 12-1, where unit 20a is relatively far away from the base station 14-1, and unit 20c is closer in.

Now it would not normally be considered to be a problem that unit 20x is far away from its respective base station 14-2 as long as the signals sent between them are transmitted at a sufficiently high power level. However, in systems that use forms of Code Division Multiple Access (CDMA), such far away units do pose a problem to efficient operation of other units attempting to be serviced in the same cell.

In particular, with CDMA type modulation, signaling being carried over the air between unit 20x and the respective base station 14-2 occupies the same radio frequency channel at the same time as information being carried between the base station 14-2 and the closer in mobile unit 20z. In order for the base station 14-2 to communicate effectively with the mobile unit 20x, it is necessary therefore for the power level of the signal radiated from base station 14-2 towards the mobile unit 20x and/or the signal radiated from the mobile unit 20x towards the base station 14-2 to be at a much greater intensity than the power level of signals required for the base station 14-2 to communicate with the mobile unit 20z, which is much closer in. In a CDMA system, signals at relatively high power levels such as those originating from the mobile unit 20x, therefore may interfere with the operation of signals needed to communicate with a mobile unit 20z that is operating at a much lower power level.

The invention seeks to coordinate the allocation of resources to the far away mobile units such as 20x and 20a that are nearer in in adjacency area 15. Specifically as will be understood in greater detail later on, mobile unit 20x is preferably scheduled to operate during periods of time when low power units are not necessarily scheduled for operation. This coordination may take place, in the preferred embodiment, among base stations such that high power transmissions from mobile unit 20x do not interfere, for example, with low power communications in cell 12-1 such as may be emanating to or from mobile unit 20c.

Figure 2:
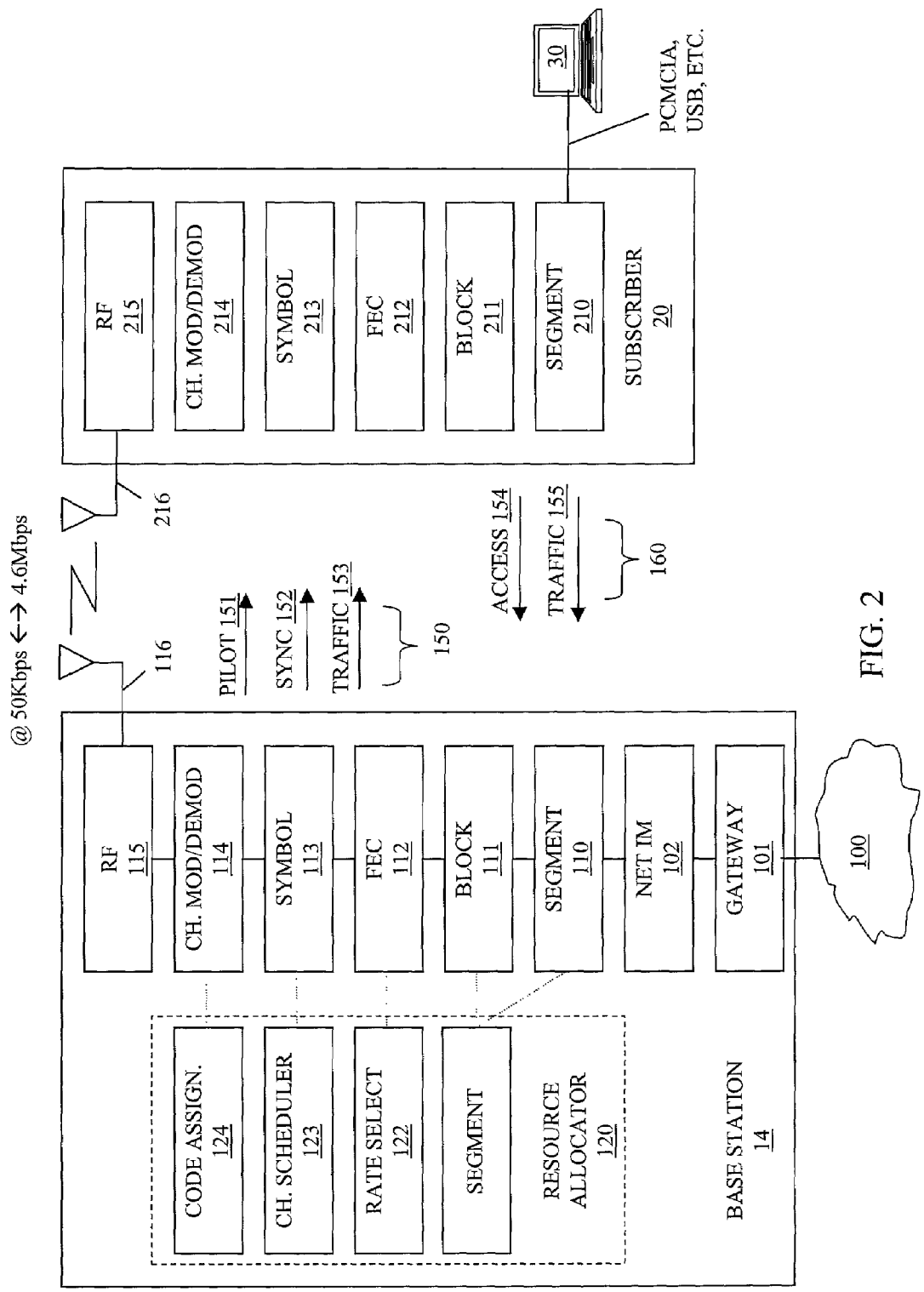
FIG. 2 is a more detailed diagram of a base station and remote unit as used for data communications.

Turning attention now to FIG. 2, there is a more detailed block diagram of the components of a base station 14 and subscriber unit 20 that may provide flexible allocation of channel resources according to a preferred embodiment of the invention.

It is desirable to provide a number of degrees of freedom to the system manager by permitting access to individual radio channels in small capacity increments. For example, various Forward Error Correction (FEC) coding rates, modulation types, and number of bits per symbol may be changed and/or allocated to different user connections based upon observed channel conditions and instantaneous demand for bandwidth access. A co-pending patent application Ser. No. 09/773,253 filed on even date herewith entitled "Maximizing Data Rate by Adjusting Codes and Code Rates in CDMA System" provides further details of how such a system may be implemented. Briefly, network gateway connection equipment 101 may provide connections from the base station 14 to a data network such as the Internet 100. For signals traveling from the base station 14 towards the subscriber unit 20, the network traffic signals which may be formatted as typical network layer messages, such as Transmission Control Protocol/Internet Protocol (TCP/IP) messages, are fed from the gateway to network interfaces circuits 102. The segmenting circuit removes the TCP/IP formatting information forwarding the data to a blocking function 111. The block function groups bits into a predetermined block size before they are fed to Forward Error Correction (FEC) process 112. The FEC process adds error correction information to groups of data bits prior to there being fed to a symbol encoding process 113. The symbol encoding process further groups bits in groups of two, three, four, or larger bits depending upon the type of radio frequency modulation that is in use at any particular time. For example, if Quadrature Phase Shift Keyed (QPSK) modulation is being used, bits are grouped in groups of four for each QPSK symbol. Radio frequency up conversion circuits 115 provide the radio signal to a base station transmit antenna 116.

Additional functions in the base station 14 provide for allocation and deallocation of specific channels as required. Specifically, a code assigner 124 assigns pseudorandom (PN) codes in groups of two or more codes to any given particular connection. For example, at times of relatively low demand, the code assigner 124 may only assign two PN codes; at times of greater demand, the code assigner 124 may assign up to twenty-four PN codes to a given connection. A channel scheduler 123 controls the allocation of channels based upon a demand. A rate selector 122 and segment blocking controller circuit 121 control the FEC rate applied and/or block size based upon the observed channel conditions and desired bit error rate. It is sufficient here to mention that the resource allocator 120 permits the bases station 14 to control the exact number of channel resources that are applied to any given connection with a particular subscriber unit 20 at any given point in time. Thus, for example, the data rates may actually range from a lowest possible rate of 20 kilobits per second (kbps) to a high data rate of 4.6 Mega bits per second (mbps), again as described in the referenced co-pending patent application.

Analogous operations are performed on the subscriber side in order to receive signals including RF down conversion 215 on the channel demodulation 214, symbol decoding 213, FEC decoding 212, block assembly 211, and resegmenting 210 in order to reconstruct the TCP/IP frame.

It should be understood that the radio channels provide both forward link radio channels 150 and reverse link channels 160. The forward link channels are those carrying information in the direction from the base station 14 towards the subscriber unit 20. The reverse link channels 160 carry information from the subscriber unit 20 towards the base station 14. The forward link channels 150 often include pilot channels 151 and synchronization channels 152 as well as the traffic channels 153 that actually carry the specific payload data from the base station to each individual subscriber unit 20. Control signaling is carried on an access channel 154 along with traffic payload information on traffic channels 155 in the reverse link 160. Ultimately the data from the subscriber unit 20 is fed to the laptop computer 30, for example, where the user is accessing the Internet through the wireless connection provided by the subscriber unit 20 and base station 14.

Turning attention now to FIGS. 3A and 3B, one example situation will be described in further detail that illustrates the need for controlling access to resources in accordance with the invention. In particular, consider a situation in a first cell 12-1 as shown in FIG. 3A (as previously had been described in connection with FIG. 1), where a unit 20x is requesting access to 65% of the available resources and units y and z are respectively requesting access to 27% and 12% of the available resources. The amount of available resources graphed on the y axis with the maximum amount available (100%) being the hash mark.

In the negative going direction on the y axis is plotted the amount of relative interference to the adjacent cell 12-1 presented by each given subscriber unit. For example, unit 20z requests only a small amount, 12%, of the available resources, and is operating at relatively low power being close in to its respective base station 14-2. Thus the amount of interference it generates in the adjacent cell 12-1 as compared as a total percent of the available capacity in cell 12-1 is relatively small, as illustrated by the dashed lines, $z_i$. On the other hand, unit 20x is generating a much larger amount of interference, $x_i$, in the adjacent cell, which represents almost 50% of the available capacity in the adjacent cell 12-1. This, of course, provides for additional problematic situation in the management of capacity in cell 12-1, given that a unit 20x which it is not even presently controlling is generating a significant amount of interference to the units 20a, 20b, and 20c for which it is controlling in its own cell 12-2.

A similar situation occurs in the adjacent cell site 12-1 considering units 20a, 20b, and 20c. Specifically, unit 20a, although requesting 70% of the available resources in its own cell 12-1 and although not actually falling in the adjacent area 15, is still located in an area that is sort of towards the direction of cell 12-2. It thus is generating enough interference that it is equivalently using 35% of the available resources in cell 12-2 as indicated by the dashed lines, $a_i$. Again, a unit such as 20c is generating only a very small amount of interference, $c_i$ to its respective adjacent cell 12-2. The units 20y in cell 12-2 and 20b in cell 12-1 are not particularly generating an incredulous amount of interference in their adjacent cells as indicated respectively by the 6% interference and 10% interference levels plotted next to indicators $y_i$ and $b_1$ respectively.

It should be understood that this situation is an example only, and that actual interference levels are difficult to compute or even measure in a real system. What is important is to recognize that interference generated is relatively stronger the more towards the edge of a cell that a remote unit 20 is.

Figure 4B:
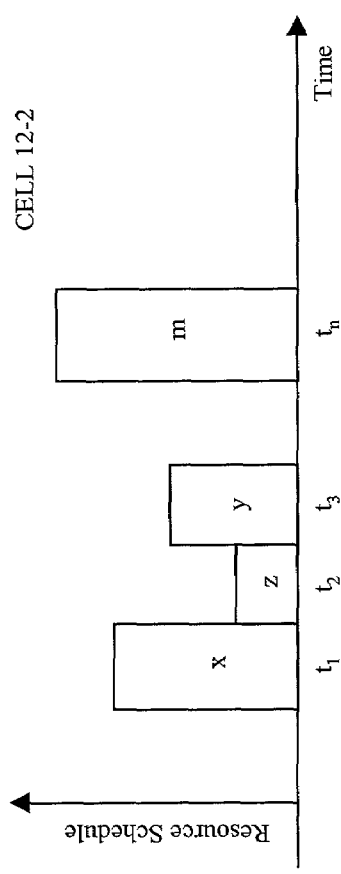
FIGS. 4A and 4B illustrate one possible time slot schedule for a first and second cell.
Figure 4A:
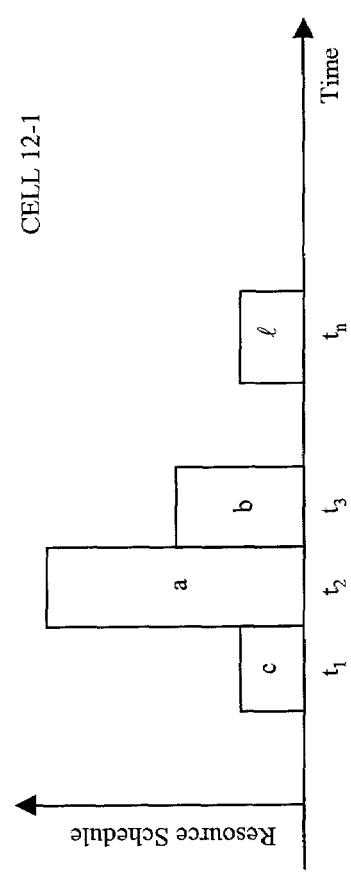

What is needed in order to resolve this situation is a way to schedule the high interference transmissions, such as those used by unit 20$x$, with relatively low interference transmissions in an adjacent cell, such as those used by unit 20$c$. Thus, as shown in FIG. 4A, if the resource scheduling process 120 in base station 14-2 associated with cell 12-2 were to assign resources as indicated in FIG. 4A, and a resource allocator 120 in base station 14-1 associated with cell 12-1 were to assign its resources as in FIG. 4B, overall interference to the operation to an adjacent base station would be minimized.

In particular, at a time $t_1$, it is seen that communication resources are allocated to unit 20$x$ which is a unit that generates relatively large amounts of interference to its adjacent cell 12-1. In cell 12-1 at this time $t_1$, resources are allocated to a unit 20$c$ which uses a relatively small amount of the available resources in its respective cell 121. Likewise at time $t_2$, the resource-demanding unit 20$a$ in cell 12-1 is allocated resources, while at the same time, $t_2$, the less demanding unit 20$z$ is allocated resources in cell 12-2. Similarly, time $t_3$ can be allocated for relatively average level demand units 20$b$ and 20$y$ in their respective cells 12-1 and 12-2.

In general, at a time $t_n$, a subscriber unit 20$m$ demanding a relatively greater amount of resources can be scheduled for operation at the same time that a unit 201 is demanding fewer resources in an adjacent cell 12-1.

Figure 5A:
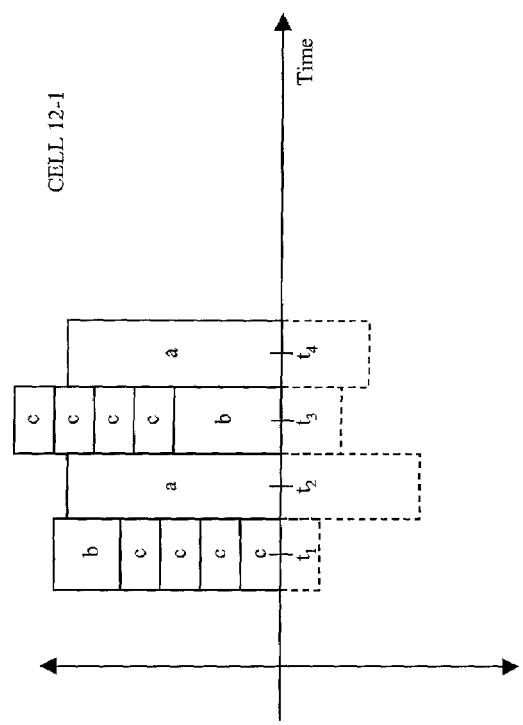
FIGS. 5A and 5B illustrate another possible time slot schedule for the first and second cells.
Figure 5B:
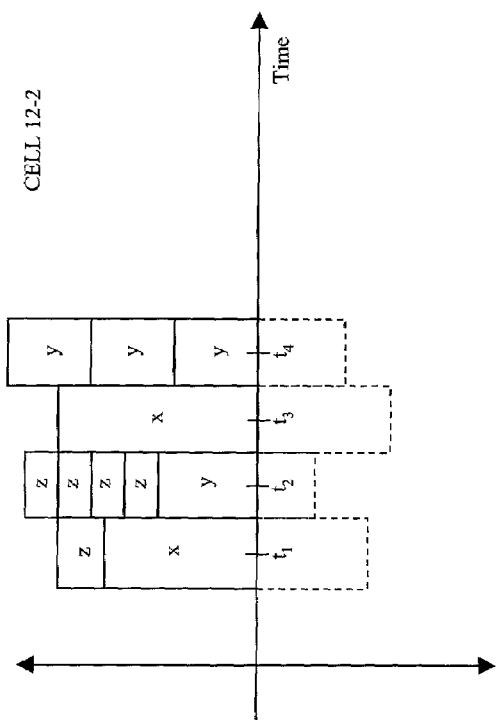

More sophisticated algorithms can be employed with the invention to schedule maximum utilization of the available resources. For example, as shown in FIGS. 5A and 5B, multiple resources in cells 12-2 and 12-1 can be scheduled at each of times $t_1$, $t_2$, $t_3$, and $t_4$, as illustrated. For example, at a time $t_1$, allocation of resources are made to subscriber unit 20$x$, but because 20$x$ does not use the entire capacity available (recall that it only uses 65% of the available resources), there is room to allocate resources to other less demanding units such as unit 20$z$. A similar situation exists at time $t_1$ in cell 12-1 whereby less demanding units 20$c$ may actually be enabled at the same time so that multiple such units may be serviced, $t_1$ and/or even medium demand units 20$b$ may be serviced.

Thus, the resource allocators 120 at the cell sites 12 attempt to cooperate with one another in order to maximize the utilization of available resources without scheduling relatively high interference communications in a particular timeframe in two adjacent cell sites at the same time.

It should be understood that time slotting of resources in this manner is only meaningful for data communications and is not expected to be effective for voice channels. In a time multiplexed data system, random delay in data delivery can typically be easily tolerated.

Figure 6:
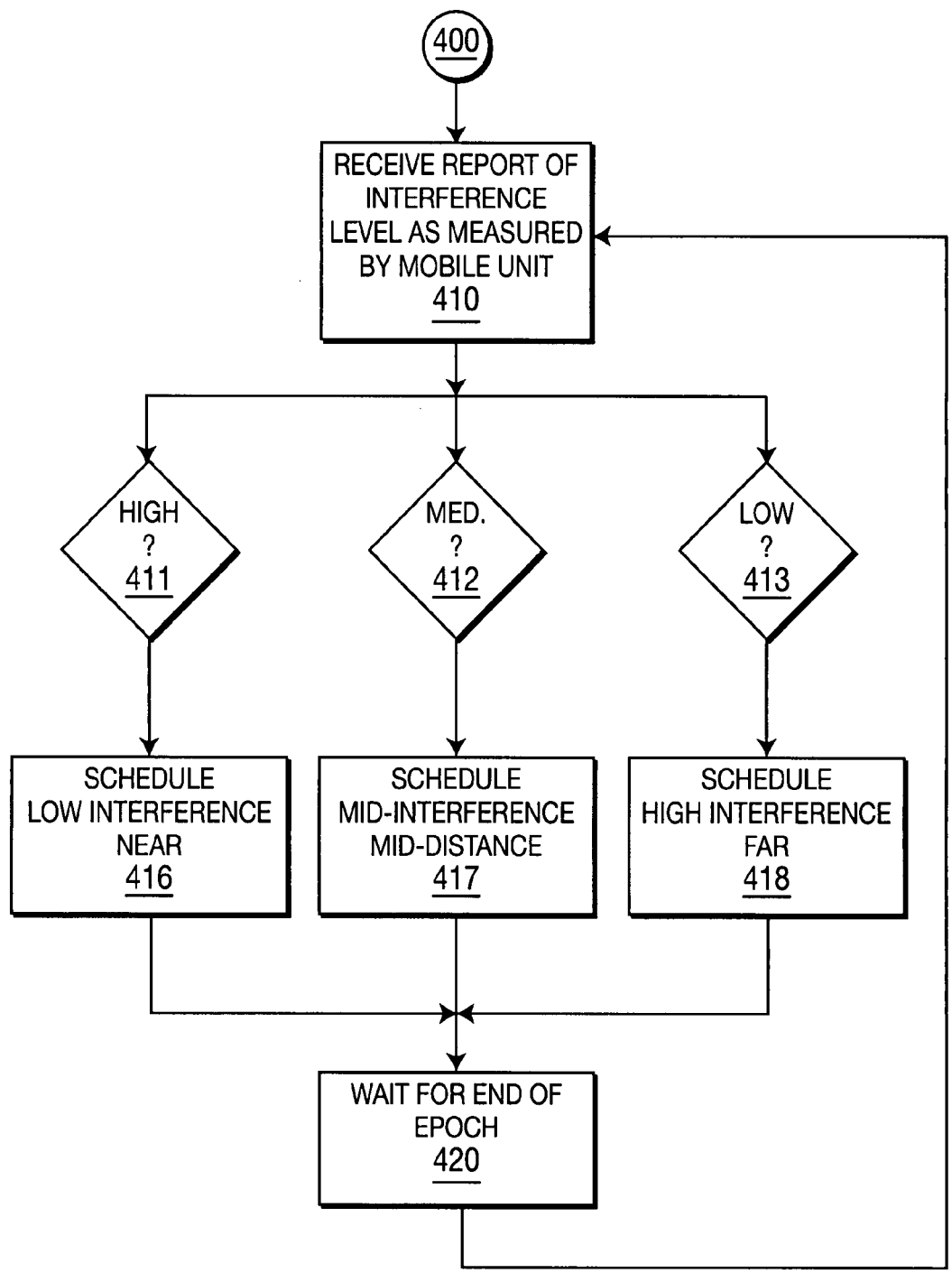
FIG. 6 is a flowchart for one possible process to implement time slot schedules.

A process may occur in a resource allocator 120 as shown in FIG. 6 to accomplish the desired result. From an initial state 400, a first step 410 occurs when a base station receives a report of an expected interference level from an adjacent base station. In particular, adjacent base stations 14 may cooperate by communicating a list of power levels for active units being serviced, at a minimum, and even expected time slot schedules for high interference transmissions. This communication may occur over a separate data network implemented using wireline connections between the base stations 14. Alternately, the base stations may report a list of active remote units and power levels to a Base Station Controller (BSC) 16. The BSC then works out a schedule for how the adjacent base stations 14 will share the high interference time slots, and forwards a schedule for each base station 14 to follow in assigning units 20 to time slots $t_n$.

In any event, in state 410, after having determined relative expected interference levels over a future period of time, one of three states 411, 412, or 413 is next entered. In the case of there being a relatively high interference level for a time period as in state 411, the resource scheduler 120 will schedule relatively low interference, or near-in communications such as to units 20$c$ and 20$z$. Such scheduling occurs until the end of the timeframe or epoch in state 420 in which the process is repeated when another report is received again in state 410.

Returning to state 410, should a relatively low interference level be scheduled for the upcoming time epoch, then a state 418 is entered in which relatively high interference communications may be scheduled for this epoch. Thus, for example, in state 410, since it is known that the adjacent base station will be generating only low interference, then relatively high interference communications can be scheduled for the present base station. Finally, state 412 is entered from state 410 if medium levels of interference are expected, in which case medium interference generation signals can be scheduled for transmission in state 417 during this period.

There is another scenario for coordinating the high interference time slots among adjacent base stations. A flowchart of a process for implementing this scheme appears in FIG. 7. In a first state 510, a cell site such as cell site 12-1 broadcasts a service status message. The service status message contains information that may be used by adjacent base stations 14 in determining how to coordinate their transmissions. At a minimum, the service status message contains information such as an estimate of the percent of available resources that base station 14-1 is presently committing to servicing remote units 20$a$, 20$b$, and 20$c$ located within its respective cell 12-1 (FIG. 1). Other information such as the relative amount of resources and/or power levels being consumed by unit, such as unit 20$a$ located on the periphery of respective cell 12-1 may also be included in this service status message.

In any event, in state 510, the service status message is broadcast by the base station 14-1 to mobile units 20$a$, 20$b$, and 20$c$ located within its cell 12-1. The service status message may be broadcast on a forward link paging channel or other control channel to the remote units 20.

In state 512, a service status message is received at a particular remote unit. The service status message is then rebroadcast on a reverse link channel such as in access or control channel. This rebroadcasting occurs in state 514.

If the rebroadcast service status message is detected by the same base station that originated it, nothing further happens in that base station. Thus, for example, a service status message received at remote unit 20$c$ from base station 14-1 may be then rebroadcast by remote unit 20$c$ and ultimately received by the same base station 14-1. In this instance, base station 14-1 will do nothing further.

However, if a state 516 is reached such that an adjacent base station, such as base station 14-2 receives a rebroadcast service status message that originated from a different base station 14-1, further action is taken as follows. For example, base station 14-1 may broadcast a service status message to remote unit 20$a$. The remote unit 20$a$, upon rebroadcast of the service status message, will not only rebroadcast the service status message with sufficient power level to be received by its controlling base station 14-1, but also by the adjacent base station 14-2 associated with cell 12-2.

At this point, in state 518, the base station 14-2 reads the information in the service status message and makes the determination as to whether its own resources are busier than the resources in the adjacent base station 14-1. If that is not the case, that is, base station 14-2 is not busier than base station 14-1, then a state 520 is entered. In this state 520, the second base station 14-2 waits for a predetermined time to assign a time slot to an outlying remote unit such as remote unit 20*x*.

If, however, in state 518, it was determined that the base station 14-2 is busier than base station 14-1, then transmissions to its own outlying remote unit 20*x* will occur right away.

In this manner, base stations that are relatively busier than one another or more heavily loaded than others will assume that they have authority to schedule broadcasts for their high interference transmissions and the lesser utilized adjacent base stations will delay their communications. Other parameters may be associated with the service status message so that base stations can coordinate their transmissions accordingly.

This latter arrangement described in connection with FIG. 7 has an advantage over that described in FIG. 6 in that it is self-organizing and adaptive to changes in signal propagation environments. Even differences in cell geography will be automatically adapted to, to some extent, since only adjacent base stations that are potentially interfered with will hear the rebroadcast service status message and act upon it.

However, the embodiment of FIG. 6 has the advantage that communication is more precisely scheduled among adjacent base stations such as by the central base station controller 16 that can precisely allocate time slot periods $T_n$ among adjacent base stations, to ensure that high probability of interference communications in the first base station are scheduled for times when low probability of interference communications are scheduled in adjacent base stations.

While this invention has been particularly shown and described with references to preferred embodiments thereof, it will be understood by those skilled in the art that various changes in form and details may be made therein without departing from the scope of the invention encompassed by the appended claims.

What is claimed is:

1. In a wireless communication system in which remote subscriber units are located in cells, and at least two cells are located adjacent one another, each cell having a base station unit that coordinates communication with remote units located within its respective cell, a method comprising the steps of:
   in an operating base station, determining the existence of communications occurring in adjacent cells;
   receiving, by the operating base station, a report of an expected time of low interference communications from an adjacent base; and
   scheduling transmission of high interference communications associated with a subscriber unit in the cell associated with the operating base station at the expected time of low interference communications in the adjacent cell.

2. A method as in claim 1 wherein the report is a report of a service status message from the adjacent base station and is relayed from a subscriber unit located in the cell served by the serving base station.

3. In a wireless communication system in which remote subscriber units are located in cells, and at least two cells are located adjacent one another, each cell having a base station unit that coordinates communication with remote units located within its respective cell, a method comprising the steps of:
   in an operating base station, determining the existence of communications occurring in adjacent cells;
   receiving, by the operating base station, a report of an expected time of high and low interference communications from an adjacent base station; and
   scheduling transmission of high interference communications associated with a subscriber unit in the cell associated with the operating base station at the expected time of low interference communications in the adjacent cell.

4. A method as claimed in claim 1, wherein transmission scheduling further comprises:
   assigning specific time slots to specific subscriber units; and
   coordinating allocation of a time slot to a high interference communication in one base station with the allocation of a time slot for a low interference communication in an adjacent base station.

5. A method as claimed in claim 1, wherein the coordinated communications are reverse link signals traveling from the subscriber units towards the base stations.

6. A method as claimed in claim 1, wherein the coordinated communications are forward link signals traveling from the base station towards the subscriber units.

7. A method as claimed in claim 3, further comprising:
   scheduling transmission of low interference communications associated with a subscriber unit in the cell associated with the operating base station at the expected time of high interference transmissions from the adjacent base station.

8. A wireless communication system comprising:
   at least two cells located adjacent to one another, each cell having a base station unit that coordinates communication with remote units located within its respective cell;
   a communications link for transmitting, to a first base station from a second base station, a report of an expected time of high and low interference communications from an adjacent base station; and
   a resource allocator at the first base station for scheduling transmission of high interference communications associated with a subscriber unit in the cell associated with the first base station at the expected time of low interference communications in the adjacent cell.

9. The wireless communication system of claim 8, wherein the communication link is a wire line.

10. The wireless communication system of claim 8, wherein the communication link further comprises a resource allocation station.

11. The wireless communication system of claim 8, wherein the coordinated communications are reverse link signals traveling from the subscriber units towards the first base station.

12. The wireless communications system of claim 8, wherein the coordinated communications are forward link signals traveling from the first base station towards the subscriber units.

* * * * *

UNITED STATES PATENT AND TRADEMARK OFFICE
CERTIFICATE OF CORRECTION

PATENT NO. : 7,236,793 B2 Page 1 of 1
APPLICATION NO. : 09/773255
DATED : June 26, 2007
INVENTOR(S) : Amalfitano et al.

It is certified that error appears in the above-identified patent and that said Letters Patent is hereby corrected as shown below:

IN THE DRAWINGS

Figure 7:
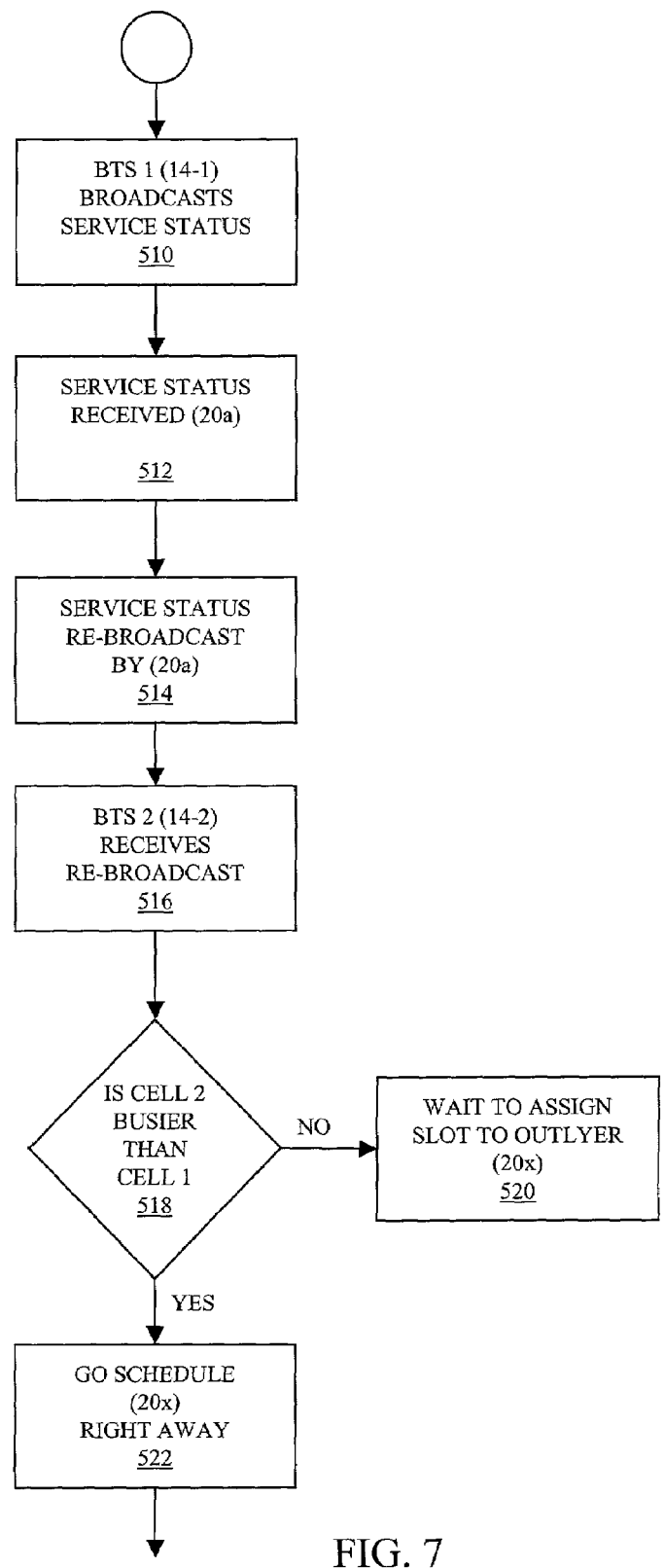
FIG. 7 is a flowchart of another embodiment for coordinating time slot usage.

At FIG. 7, item 520, line 2, after the words "SLOT TO", delete "OUTLYER" and insert therefor --OUTLYING UNIT--.

At column 1, line 41, after the word "closer", delete "into" and insert therefor --in to--.

At column 3, line 67, after the word "computer", delete "to".

At column 4, line 62, delete the second instance of the word "in".

At column 5, line 57, after the words "permits the", delete "bases" and insert therefor --base--.

At column 6, line 39, after the word "compared", delete "as" and insert therefor --to--.

At column 6, line 64, before the word "respectively", delete "$b_1$" and insert therefor --$b_i$--.

At column 7, line 13, after the word "operation", delete "to" and insert therefor --of--.

At column 7, line 20, after the word "cell", delete "121" and insert therefor --12-1--.

At column 8, line 49, after the words "such as", delete "in" and insert therefor --an--.

IN THE CLAIMS

At claim 1, column 9, line 46, after the word "adjacent", insert --to--.

At claim 3, column 10, line 1, after the word "adjacent", insert --to--.

Signed and Sealed this

Fourteenth Day of September, 2010

David J. Kappos
*Director of the United States Patent and Trademark Office*